UNITED STATES PATENT OFFICE.

FRED M. LOCKE, OF VICTOR, NEW YORK.

MANUFACTURE OF HIGH-POTENTIAL PORCELAIN AND GLASS INSULATORS.

1,127,042.

Specification of Letters Patent. Patented Feb. 2, 1915.

No Drawing. Application filed March 9, 1909. Serial No. 482,382.

*To all whom it may concern:*

Be it known that I, FRED M. LOCKE, of Victor, New York, in the county of Ontario, in the State of New York, have invented new and useful Improvements in the Manufacture of High-Potential Porcelain and Glass Insulators, of which the following is a full, clear, and exact description.

This invention relates to certain improvements in the manufacture of insulators for high potential electric conductors, and refers more particularly to a composition electrical insulation as a new article of manufacture, the essential ingredients of which are boron or boron compound and porcelain or glass thoroughly mixed by trituration or levigation and then molded and fired in the usual manner for porcelain or glass insulators.

The use of glass as an insulator for high potential electric conductors is recognized by manufacturers and users as being impracticable owing to its brittleness and susceptibility to breakage by varying temperatures or climatic conditions, and also from the dielectric stresses and resultant heat to which it is subjected. For this reason porcelain, which appears to have a greater dielectric strength and is less susceptible to breakage by variations in temperature or climatic conditions, is generally employed. By porcelain I mean a compound of the usual ingredients well known in the art as silica, aluminum clay and feldspar.

The primary object of my present invention is to increase the inductive capacity, dielectric strength and heat-resisting properties of this class of insulators to more effectively resist puncture or disintegration by an electric current or static charges therefrom, or from temperature or climatic changes.

I have discovered that by incorporating a suitable quantity of boron or boron compound, such as boracic acid, with the body of porcelain or glass usually employed for insulators, the inductive capacity, dielectric strength and resistance to puncture or disintegration by the electric current and sudden temperature or climatic changes, are increased approximately 20% over the same size and form of the best of porcelain insulators. For example, in the experiments which I have made to determine the relative specific inductive capacity of air, glass, porcelain and my improved insulator composition, I find that the specific inductive capacity of this composition is three times as great as that of the commercial porcelain insulators of the same size and form; six times as great as glass, and twelve times as great as air.

In the tests which I have made to determine the resistance to puncture by high voltage, I find that where a porcelain insulator of the best quality was capable of resisting 80,000 volts, an insulator made of my improved composition and of the same size and form as the porcelain insulator, withstood 100,000 volts, or 20,000 volts more than the porcelain insulator, which was due solely to the increased specific inductive capacity and dielectric strength produced by the boron compound. This high inductive capacity and dielectric strength which gives great toughness to the insulator, is probably due to the fact that boron and hydrogen form no compound or compounds under fusion, and except in one or two special instances and under special circumstances, boron forms no compound whatsoever with hydrogen, thereby more effectively excluding moisture from the composition, which is believed to partially account for the high inductive capacity, dielectric strength, as well as nonpuncturability and resistance to heat.

The composition and manufacture of high potential porcelain and glass insulators is well understood, and in the formation of my improved composition the boron compound, such as boric acid, and porcelain or glass ingredients, are thoroughly mixed in suitable proportions, the proportion of boron compound ranging anywhere from 1% to 60%, according to the specific inductive capacity required, although the smallest percentage is effective in adding materially to the dielectric strength and tenacity of the insulator, whether the base is porcelain or glass, and reduces the liability to puncture and breaking down by the electric current or static charges to a minimum.

The invention herein relates to a structure adapted to serve as an insulator in the technical meaning of the term as applied to an article of manufacture, and the terms "insulating support for line conductors" and "insulator for high potential electric conductors" are used in the claims herein to clearly define such structure as an article of manufacture to serve as an insulator in the technical meaning of the term.

What I claim is—

1. An insulator for high potential electric conductors composed of a vitrifiable base and a boron compound or derivative fused together in a homogeneous body.

2. An insulator for high potential electric conductors as an independent article of manufacture formed as an entirety of a composition material composed of a fusible base and a boron compound fused together.

3. As an article of manufacture, an insulating support for line conductors formed as a whole of a composition body including a boron compound molded and fired.

4. As an article of manufacture, an insulator for high potential electric conductors formed as an entirety of a vitrifiable base and a boron compound molded and fired to form a homogeneous body.

5. As an article of manufacture, an insulating support for line conductors formed as an entirety of a vitrifiable base and a boron compound fused together to form a homogeneous body.

6. An insulating support for line conductors composed of a glass base and a boron compound fused therewith to form a homogeneous body.

In witness whereof I have hereunto set my hand this 1909.

FRED M. LOCKE.

Witnesses:
C. O. MOORE,
W. A. HIGINBOTHAM.